UNITED STATES PATENT OFFICE.

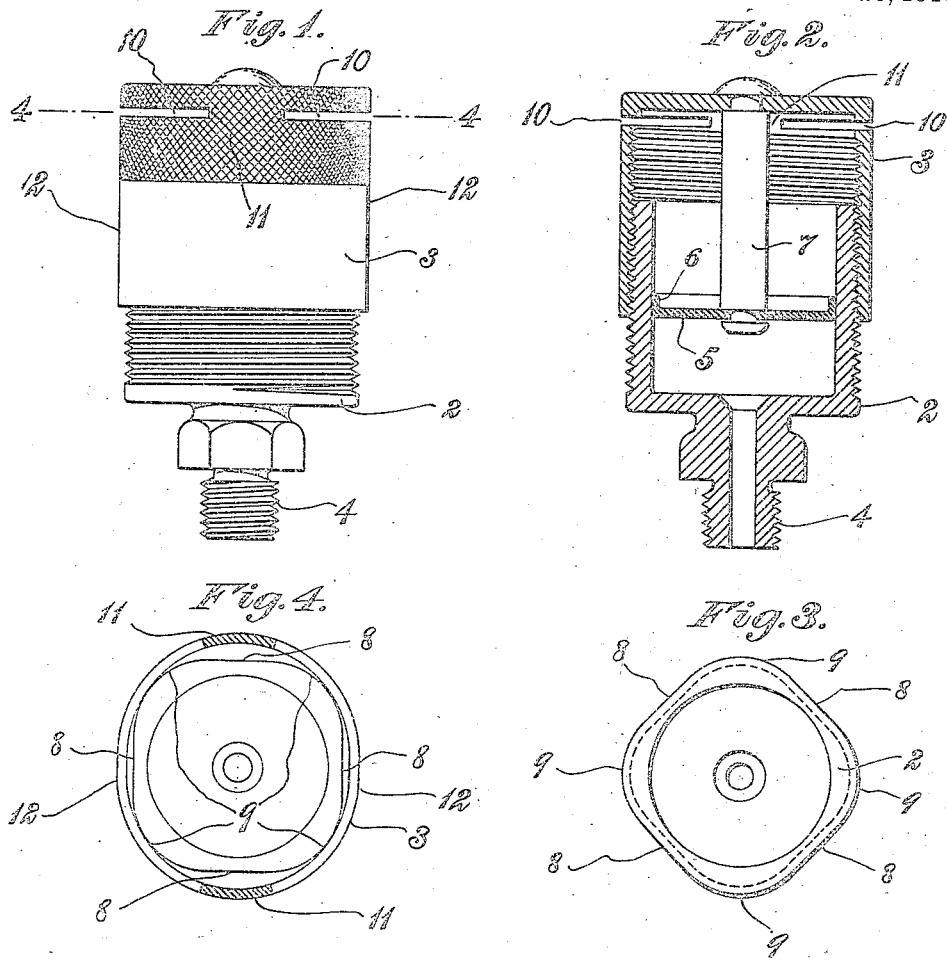

BENGT M. W. HANSON, OF HARTFORD, CONNECTICUT.

GREASE-CUP.

1,053,988.   Specification of Letters Patent.   Patented Feb. 25, 1913.

Application filed September 6, 1910. Serial No. 580,480.

*To all whom it may concern:*

Be it known that I, BENGT M. W. HANSON, a citizen of the United States, residing at Hartford, in the county of Hartford and State of Connecticut, have invented certain new and useful Improvements in Grease-Cups, of which the following is a specification.

This invention relates to what I shall, for convenience, term a grease-cup as it is primarily intended for containing grease although it is conceivable that it may receive some other lubricant or substance.

In devices of the character set forth there is usually a base member and a cap member and the latter is generally though not always necessarily as in the present case, threaded onto the base member. When the cup is used in connections where there is considerable jar as in the case of an automobile and various kinds of engines and like apparatus, such jar or vibration shakes loose the cap member and it is a very common incident when this occurs in the case of an automobile the cap is lost.

It is one of the more important features of the invention to provide simple and effective means to positively lock the cap member in place and against accidental turning off although the construction is such that the cap member may be freely turned by hand to feed the grease, replenish the cup with such substance or for any other purpose.

There are several ways of carrying my invention into effect and in the drawings accompanying and forming part of the present specification I have represented in detail one of these and so that those skilled in the art can properly practise the invention I will set forth fully this particular embodiment of my invention in the following description while the novelty of the invention will be included in the claims succeeding said description. From the observation just made it will be clear that I do not restrict myself to such disclosure as I may depart radically therefrom within the spirit of my invention as expressed in said claims.

Referring to said drawings, Figure 1 is an elevation of a grease cup including my invention. Fig. 2 is a vertical sectional view of the same. Fig. 3 is a top plan view of the base member of the cup. Fig. 4 is a section on the line 4—4 of Fig. 1.

Like characters refer to like parts throughout the several figures.

As will be inferred from what I have already stated the cup involves a base member and a cap member, denoted respectively by 2 and 3, the base member being usually connected directly with the part to be lubricated and it may be provided for this purpose with an externally-threaded shank 4 which is made hollow or tubular to act as a duct for conveying the grease from the base member or cup proper of the device said base member having a hole in its bottom for the passage of the grease into said shank 4. The cap member 3 is threaded onto the base member 2 and owing to this relation the turning of the cap member to the right, in the present case, effects the feed of the grease as will be pointed out hereinafter.

In the hollow base member 2 is shown a plunger 5 which constitutes an effective positive feed device and the external shape of which agrees with the internal shape of the base member 2. Said plunger therefore may as shown consist of a disk closely fitting and sliding in the base member and having an upturned annular guide flange 6 at the margin thereof. The plunger 5 is preferably connected with the cap member 3 and for this purpose the stem 7 may be provided, said stem being conveniently riveted to the top of the cap member 3 and to the plunger 5 practically as shown although there are naturally other ways of connecting the parts.

It will be assumed that there is a mass of grease in the cup between the plunger 5 and the bottom of the base member 2. It follows therefore that when the cap member 3 is turned to the right the plunger will force this grease from the base member 2 through the outlet therein to which I have hereinbefore alluded and through the shank 4 to lubricate the part which requires lubrication. There may be cases where the threaded connection between the members 2 and 3 is a left and not a right one and in such an event the feed movement of the cap member 3 would be to the left.

The base member 2 has externally thereof four flat faces each designated by 8 connected by curved portions 9 and said curved portions or faces 9 are shown eccentric to the base member 2. More broadly stated these eccentric portions 9 act as locking shoulders or catch portions and coöperate with detent means preferably of yieldable type associated with the cap member 3 as I will hereinafter describe. The same offices performed by these locking shoulders or catch portions 9, however, can be secured in other ways within the scope of my invention, as can the resilient locking means in connection with the cap member 3. Said cap member 3 is illustrated having near its top the complemental or mating slots 10 the stock between these slots comprising necks 11 for connecting the superposed portions of the cap member 3. At this point I might remark that the upper portion of the cap member 3 is milled or knurled to facilitate its being turned. Owing to the presence of these two slots that part of the cap member 3 immediately below the slots is made resilient, yieldable or springy and the two diametrically opposite yieldable portions act as the detent means to which I have referred, to prevent accidental turning off of the cap member and as a matter of fact these also prevent accidental feed movement of the cap member.

It will be understood that the threads on the exterior of the base member 2 extend across the flat faces 8 and also across the cam portions 9, the thread being practically unbroken or uninterrupted from end to end thereof or in the present case practically from the top to the bottom of the base member. The threads in the cap member 3 are also substantially continuous from top to bottom thereof interiorly of the same. I say "substantially" as the threads in the cap member 3 do not cross the slots 10. Owing to this construction there is at all times a feed connection between the two principal members 2 and 3.

The resilient portions 12 of the cap member closely embrace or hug opposite flattened faces 8 of the base member. This fact together with the presence of the shoulders 9 effectually preventing forward or backward accidental movement except to a limited extent. It is a fact that the cap member may oscillate or vibrate back and forth but such vibration is exceedingly small and instead of being disadvantageous is rather the contrary. The cap member 3 opposite the flattened faces 8 will itself be flattened somewhat owing to the cross sectional elongation of the cap member the elongation being along an axis intersecting the two necks or connecting portions 11 as shown in Fig. 4 which is somewhat diagrammatic. The cap member 3 may be easily turned by hand to effect through the plunger 5 or otherwise the feed of the grease and as the resilient portions ride along the rises of the eccentric portions 9 the cap member will be further elongated in cross section the maximum elongation occurring when the said resilient portions are at the highest parts of the eccentric portions 9. Beyond this point the resilient portions will ride down the eccentric portions 9 the said eccentric portions 9 and resilient portions jointly acting to prevent accidental turning movement of the cap member or an undue amount thereof. The resilient portions practically ride over and then snap down said eccentric portions 9.

What I claim is:

1. A grease cup comprising a base member, and a cap member fitted thereto, one of said members having an eccentric surface and the other having a detent coöperative with the eccentric surface to limit the motion of the cap member.

2. A grease cup comprising a base member and a cap member threaded thereonto one of said members having shouldered and eccentric portions on its threaded surface and the other having a detent coöperative directly with the shouldered portion to limit the turning movement of said cap member.

3. A grease cup comprising an externally threaded base member provided on its threaded surface with a plurality of approximately flattened faces and a cam face connecting said flattened faces, and a cap member threaded onto said base member and provided with a springy portion to engage the flattened and cam faces as said cap member is turned.

4. A grease cup comprising a base member and a cap member threaded onto said base member the base member having a plurality of flattened faces and connecting cam faces on the threaded surface thereof and the threaded portion of the cap member having substantially diametrically opposite slots to produce springy portions which directly engage the threaded surface of the base member.

5. A grease cup comprising a base member and a cap member in threaded connection therewith, one of the members being slotted to form a springy portion and said springy portion engaging the threaded portion of the other member, said threaded portion having stop means engageable by said springy portion.

6. A grease cup comprising a base member and a cap member fitted thereto, the cap member having substantially diametrically opposite elongated, circumferentially extending slots to thereby produce opposite springy portions which yieldingly engage the base member, said base member being externally of polygonal form in cross section.

In testimony whereof I affix my signature in presence of two witnesses.

BENGT M. W. HANSON.

Witnesses:
  W. M. STORRS,
  LILLIAN E. JONES.